(12) United States Patent
Koontz, II

(10) Patent No.: US 8,187,098 B2
(45) Date of Patent: May 29, 2012

(54) TWO-SIDED ELECTRONIC GAME AND REMOTE CONTROLLER

(75) Inventor: Theodore W. Koontz, II, Miller Place, NY (US)

(73) Assignee: Audiovox Corporation, Hauppauge, NY (US)

( * ) Notice: Subject to any disclaimer, the term of this patent is extended or adjusted under 35 U.S.C. 154(b) by 1090 days.

(21) Appl. No.: 12/098,043

(22) Filed: Apr. 4, 2008

(65) Prior Publication Data
US 2009/0253508 A1    Oct. 8, 2009

(51) Int. Cl.
*A63F 9/24*      (2006.01)
*A63F 13/00*     (2006.01)
(52) U.S. Cl. ............................... 463/39; 463/36; 463/37
(58) Field of Classification Search .............. 463/36–37, 463/39, 46–47
See application file for complete search history.

(56) References Cited

U.S. PATENT DOCUMENTS

| | | | | |
|---|---|---|---|---|
| 4,712,693 A | * | 12/1987 | Striplin | 211/164 |
| 4,991,892 A | * | 2/1991 | Burrell | 294/212 |
| 5,767,841 A | * | 6/1998 | Hartman | 345/167 |
| D395,890 S | * | 7/1998 | Gerba et al. | D14/218 |
| 5,874,906 A | * | 2/1999 | Willner et al. | 341/22 |
| D406,847 S | * | 3/1999 | Gerba et al. | D14/218 |
| 6,213,880 B1 | * | 4/2001 | Sim | 463/37 |
| 6,565,440 B2 | * | 5/2003 | Hames | 463/39 |
| 6,565,441 B1 | * | 5/2003 | Hames et al. | 463/39 |
| 6,760,013 B2 | * | 7/2004 | Willner et al. | 345/169 |
| 6,786,822 B1 | * | 9/2004 | Leifer | 463/37 |
| 6,910,966 B2 | * | 6/2005 | Leifer | 463/37 |
| 7,091,954 B2 | * | 8/2006 | Iesaka | 345/168 |
| 2004/0095326 A1 | * | 5/2004 | Anderson | 345/168 |
| 2006/0009289 A1 | | 1/2006 | McCarten et al. | |
| 2006/0075436 A1 | * | 4/2006 | Schedivy | 725/75 |
| 2008/0004113 A1 | * | 1/2008 | Avery et al. | 463/37 |
| 2010/0017827 A1 | * | 1/2010 | Shalam et al. | 725/75 |

* cited by examiner

*Primary Examiner* — Steven J Hylinski
(74) *Attorney, Agent, or Firm* — F. Chau & Associates, LLC

(57) ABSTRACT

A remote control device, including: a housing having first and second elongated sides opposite each other, the first side including a plurality of user-operable switches for controlling a display device, and the second side including a plurality of user-operable switches for enabling a user to play a video game on the display device.

18 Claims, 3 Drawing Sheets

TWO-SIDED ELECTRONIC GAME AND REMOTE CONTROLLER

BACKGROUND OF THE INVENTION

1. Technical Field

The present invention relates to remote control devices.

2. Discussion of the Related Art

Commonly, remote controls are used to issue commands from a distance to televisions (TVs) or other consumer electronics such as stereo systems and digital video disc (DVD) players. Remote controls for these devices are usually small wireless handheld objects with an array of buttons for adjusting various settings such as TV channel, track number, and volume. Most of these remotes communicate to their respective devices via infrared (IR) signals.

Most video game systems are sold with game controllers that are connected to a console through a hard-wire link. More recently, wireless game controllers have been developed. Such wireless controllers replicate the basic control features found on conventional hard-wired controllers but use IR, radio frequency (RF) or other electromagnetic radiation to send signals to the console.

An entertainment system for a vehicle, such as a headrest entertainment system or an overhead display device, is popular because passengers can enjoy audio and video entertainment on the road. Many vehicle entertainment systems generally come with built-in DVD players, and more recently, have been designed to include video games. Such systems, however, are provided with two separate remote control devices; one for controlling the DVD player, the other for controlling the video games. As a result, there are more objects to keep track of, more potential points of failure and higher product costs.

Accordingly, there exists a need for a device that is capable of obviating these concerns.

SUMMARY OF THE INVENTION

In an exemplary embodiment of the present invention, a remote control device, comprises: a housing having first and second elongated sides opposite each other, the first side including a plurality of user-operable switches for controlling a display device, and the second side including a plurality of user-operable switches for enabling a user to play a video game on the display device.

The housing further comprises a switch for putting the remote control device in a remote mode or a game mode.

When the remote control device is in the remote mode, the user-operable switches on the first side operate and the user-operable switches on the second side do not operate; and when the remote control device is in the game mode, the user-operable switches on the second side operate and the user-operable switches on the first side do not operate.

The housing further comprises a dedicated remote mode transmitter. The dedicated remote mode transmitter is an infrared (IR) diode.

The housing further comprises a dedicated game mode transmitter. The dedicated game mode transmitter is an IR diode.

In an exemplary embodiment of the present invention, a remote control device, comprises: a housing having top and bottom sides, a pair of end sides and a pair of lengthwise sides, the top side having a plurality of user-operable switches for controlling a display device, the bottom side having a plurality of user-operable switches for enabling a user to play a video game on the display device, one of the end sides having a switch for setting an operating mode of the remote control device, the other end side having a transparent portion to permit a first transmitter to emit a beam of light therethrough, and one of the lengthwise sides having a transparent portion to permit a second transmitter to emit a beam of light therethrough.

The transparent portion of the end side is configured so that it is facing the display device when a user is operating the switches on the top side.

The transparent portion of the lengthwise side is configured so that it is facing the display device when a user is operating the switches on the bottom side.

In an exemplary embodiment of the present invention, a remote control device for use with an in-vehicle entertainment system, comprises: a housing having first and second elongated sides opposite each other, the first side including a plurality of user-operable switches for controlling a television (TV) or a digital video disc (DVD) player of an in-vehicle entertainment system, and the second side including a plurality of user-operable switches for enabling a user to play a video game on the in-vehicle entertainment system.

The in-vehicle entertainment system can be a headrest entertainment system, an overhead entertainment system or a console entertainment system.

The user-operable switches on the first side further control compact disc (CD), Moving Pictures Expert Group-1, Audio Layer 3 (MP3), Windows Media Audio (WMA), Universal Serial Bus (USB), or surround sound of the in-vehicle entertainment system.

The housing further comprises a switch for changing an operating mode of the remote control device.

The housing further comprises a first transmitter for transmitting signals input via the user-operable switches on the first side to the in-vehicle entertainment system when the remote control device is in a first operating mode.

The housing further comprises a second transmitter for transmitting signals input via the user-operable switches on the second side to the in-vehicle entertainment system when the remote control device is in a second operating mode.

The housing is flipped from the first side to the second side when the operating mode is changed from the first to the second. The housing is flipped from the second side to the first side when the operating mode is changed from the second to the first.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

A two-sided electronic game and remote controller according to an exemplary embodiment of the present invention will now be discussed. It is to be understood that although the following discussion will center on using the controller as part of an in-vehicle entertainment system, the controller can be used with any in-flight entertainment system or any entertainment system that provides both a digital video disc (DVD) player and video games, for example.

The two-sided electronic game and remote controller discussed herein combines the functionality of two separate remote control devices into a single device. In particular, the controller combines the functionality of both a video game controller and a conventional television (TV)/DVD remote controller into a single hand-held device that contains all the required components and batteries for power, for example. One side of the device contains the remote control buttons, while the opposite side of the device contains the game control buttons. Thus, instead of picking up one unit, using it, placing it down, picking up another unit and using it, one merely has to flip the same unit from one side to the other side to use it. By designing a controller like this, an in-vehicle entertainment system having both TV/DVD and video gaming capability requires only one remote, thereby reducing vehicle clutter and the cost associated with manufacturing such a product, for example.

Figure 1A:
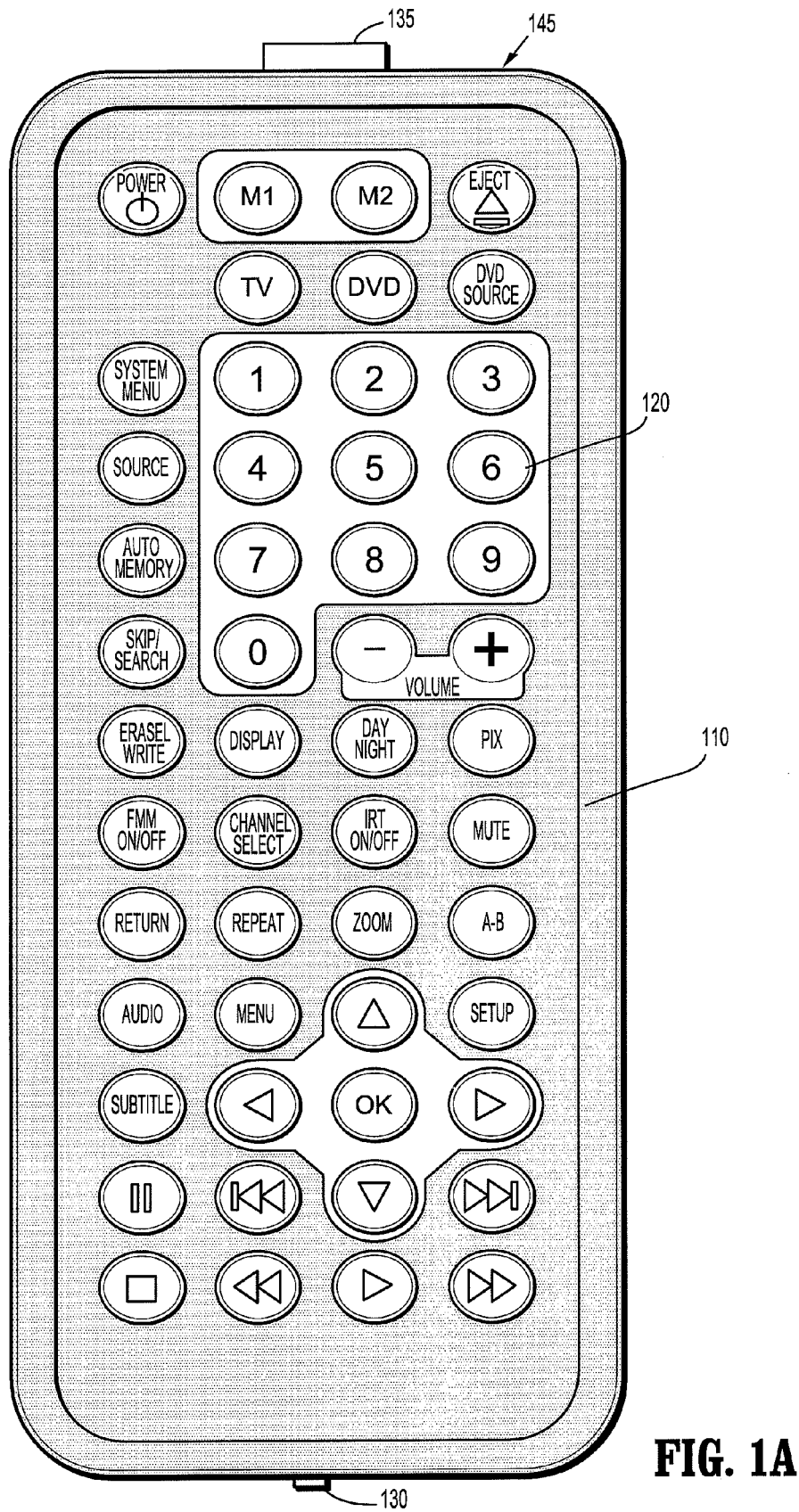
FIG. 1A illustrates one side of a two-sided electronic game and remote controller according to an exemplary embodiment of the present invention.
Figure 1B:
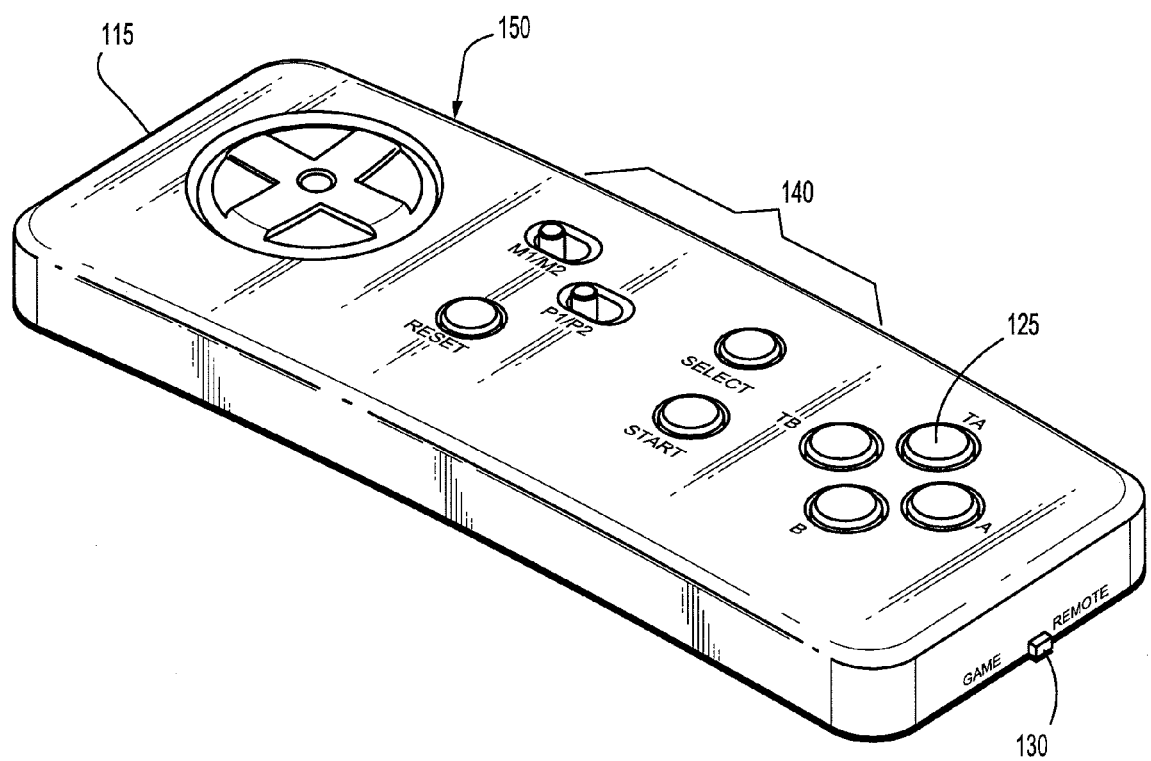
FIG. 1B is a perspective view of the controller shown in FIG. 1A mostly illustrating its other side.

FIG. 1A illustrates one side of a two-sided electronic game and remote controller according to an exemplary embodiment of the present invention. FIG. 1B is a perspective view of the controller shown in FIG. 1A mostly illustrating its other side.

As shown in FIGS. 1A and 1B, the controller is formed from a housing that includes a first elongated side 110 and a second elongated side 115. The first side 110 is opposite the second side 115.

The first side 110 includes a plurality of user-operable switches 120. The switches 120 enable a user to control an in-vehicle entertainment system 205 (see FIG. 2). The second side 115 also includes a plurality of user-operable switches 125. The switches 125 enable a user to play video games on the in-vehicle entertainment system 205. The switches 120 and 125 may be push-button, single-pole double-throw and rocker type switches, for example.

The housing also includes a switch 130 for putting the controller in a remote mode or a game mode. The switch 130 may be a push-button or single-pole double-throw type switch, for example. When the controller is put in the remote mode, certain components of the in-vehicle entertainment system 205 such as a TV or a DVD player can be operated, whereas, when the controller is put in the game mode, video games can be played on the in-vehicle entertainment system 205, for example. In addition, when the controller is in the remote mode, the switches 120 on the first side 110 are operable and the switches 125 on the second side 115 are not operable. Also, when the controller is in the game mode, the switches 125 on the second side 115 are operable and the switches 120 on the first side 110 are not operable.

Figure 2:
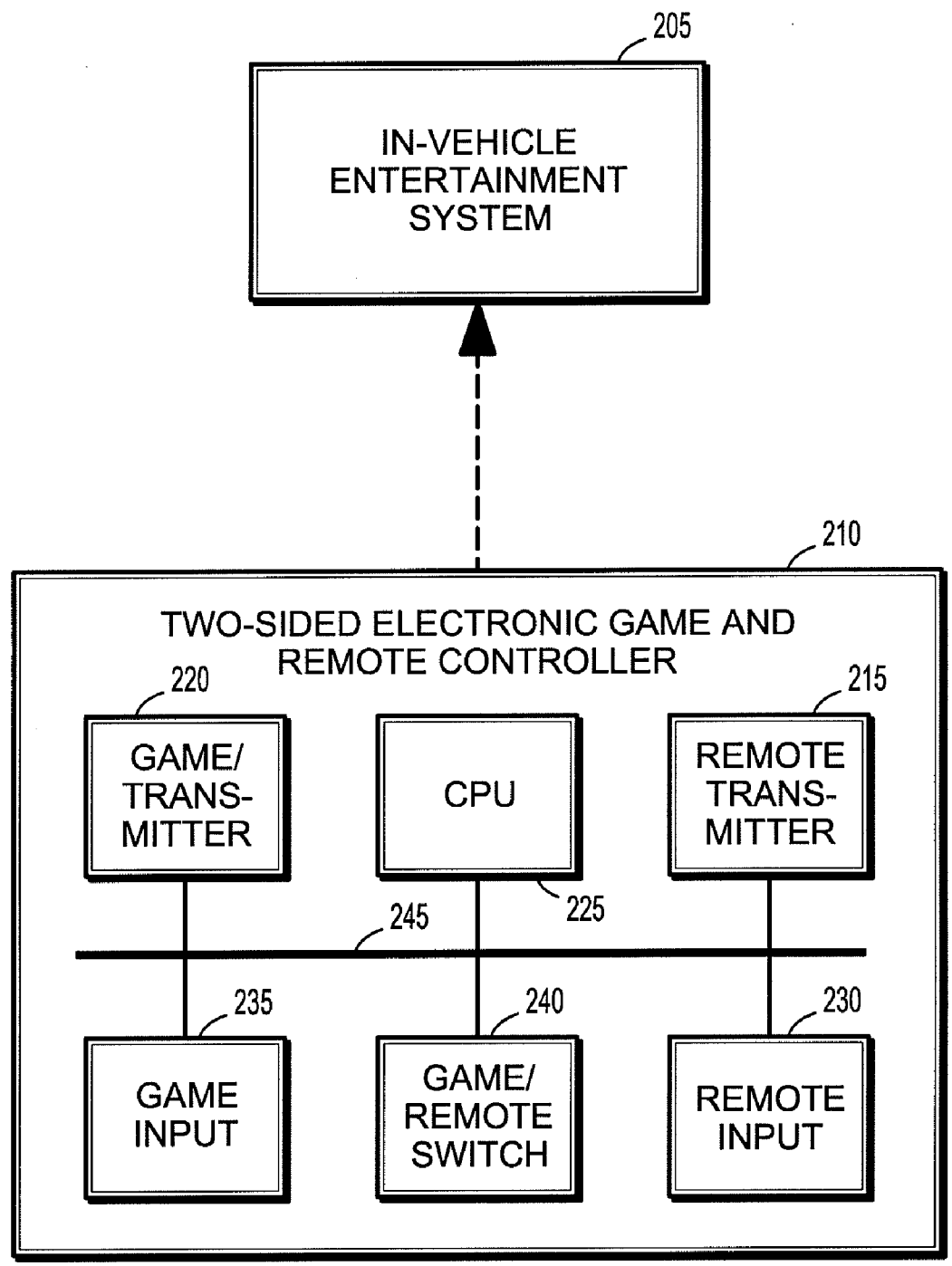
FIG. 2 is a block diagram that illustrates a two-sided electronic game and remote controller according to an exemplary embodiment of the present invention, and an in-vehicle entertainment unit.

The housing further includes dedicated remote mode and game mode transmitters 215 and 220 (see FIG. 2). The transmitters 215 and 220 maybe infrared (IR) diode type or radio frequency (RF) type, for example. The housing also includes transparent portions 135 and 140, located at an end side 145 and a lengthwise side 150 thereof. The transparent portions 135 and 140 permit the transmitters 215 and 220 to emit signals therethrough, respectively.

As shown in FIG. 1A, the transparent portion 135 is situated at the end side 145 so that the transparent portion 135 can be directed towards a display device of the in-vehicle entertainment system 205 when a user is operating the switches 120 on the first side 110, thereby enabling a beam emitted by the transmitter 215 to be directly transmitted to the display device. As shown in FIG. 1B, the transparent portion 140 is situated at the lengthwise side 150 so that the transparent portion 140 can be directed towards a display device of the in-vehicle entertainment system 205 when a user is operating the switches 125 on the second side 115 thereby enabling a beam emitted by the transmitter 220 to be directly transmitted to the display device.

FIG. 2 is a block diagram that illustrates a two-sided electronic game and remote controller 210 according to an exemplary embodiment of the present invention, and the in-vehicle entertainment unit 205.

As shown in FIG. 2, the controller 210 includes the dedicated remote mode and game mode transmitters 215 and 220, a central processing unit (CPU) 225, remote and game inputs 230 and 235, a game/remote switch 240 and a communications bus 245. The remote and game inputs 230 and 235 are analogous to the user-operable switches 120 and 125, respectively. The game/remote switch 240 is analogous to the switch 130.

The CPU 225 communicates with the components of the controller 210 over the communication bus 245. Also included in the controller 210 is a memory, either part of the CPU 225 or separate from the CPU 225, which may be any kind of programmable memory for implementing default controller 210 functions such as input and output processing, scoring functions, timer function, etc. as appropriate to the particular controller 210 implementation. In an example operation of the controller 210, when in the remote mode, upon receiving instructions via the remote input 230, the transmitter 215 wirelessly transmits these instructions to a DVD player of the in-vehicle entertainment system 205. A control program present in the DVD player causes the transmitted instructions to be effectuated. For example, the control program causes a DVD to be played so that it can be viewed on a display of the in-vehicle entertainment system 205.

It is to be understood that the in-vehicle entertainment system 205 my be a 12 volt direct current mobile video rear vehicle seat entertainment system (mounted on the vehicle's ceiling, in the vehicle's headrests or on the vehicle's center console). The electronic games can be embedded in the system's electronics. The electronic games may be single or double player games. The choice between a single or double player game can be made at the controller 210. The in-vehicle entertainment system 205 may also include a TV tuner for enabling TV to be watched on the system's display. The in-vehicle entertainment system 205 may further include other audio/visual entertainment features such as compact disc (CD), Moving Pictures Expert Group-1, Audio Layer 3 (MP3), Windows Media Audio (WMA), Universal Serial Bus (USB), surround sound, etc.

It is to be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments.

Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A remote control device, comprising:
    a housing having first and second elongated sides opposite each other, the first side including a plurality of user-operable switches for controlling a display device, and the second side including a plurality of user-operable switches for enabling a user to play a video game on the display device, the housing further having a pair of lengthwise sides disposed between the first and second elongated sides and a pair of end sides disposed between the first and second elongated sides,
    wherein a remote mode transmitter is disposed at one of the end sides and a game mode transmitter is disposed at one of the lengthwise sides.

2. The remote control device of claim 1, the housing further comprising:
    a switch for putting the remote control device in a remote mode or a game mode.

3. The remote control device of claim 2, wherein when the remote control device is in the remote mode, the user-operable switches on the first side operate and the user-operable switches on the second side do not operate; and when the remote control device is in the game mode, the user-operable switches on the second side operate and the user-operable switches on the first side do not operate.

4. The remote control device of claim 1, wherein the remote mode transmitter is an infrared (IR) diode.

5. The remote control device of claim 1, wherein the game mode transmitter is an IR diode.

6. A remote control device, comprising:
    a housing having top and bottom sides, a pair of end sides between the top and bottom sides and a pair of lengthwise sides between the top and bottom sides, the top side having a plurality of user-operable switches for controlling a display device, the bottom side having a plurality of user-operable switches for enabling a user to play a video game on the display device, one of the end sides having a switch for setting an operating mode of the remote control device, the other end side having a transparent portion to permit a first transmitter to emit a beam of light therethrough, and one of the lengthwise sides having a transparent portion to permit a second transmitter to emit a beam of light therethrough.

7. The remote control device of claim 6, wherein the transparent portion of the end side is configured so that it is facing the display device when a user is operating the switches on the top side.

8. The remote control device of claim 6, wherein the transparent portion of the lengthwise side is configured so that it is facing the display device when a user is operating the switches on the bottom side.

9. A remote control device for use with an in-vehicle entertainment system, comprising:
    a housing having first and second elongated sides opposite each other, the first side including a plurality of user-operable switches for controlling a television (TV) or a digital video disc (DVD) player of an in-vehicle entertainment system, and the second side including a plurality of user-operable switches for enabling a user to play a video game on the in-vehicle entertainment system, the housing further having a pair of lengthwise sides disposed between the first and second elongated sides and a pair of end sides disposed between the first and second elongated sides, wherein a first mode transmitter is disposed at one of the end sides and a second mode transmitter is disposed at one of the lengthwise sides.

10. The remote control device of claim 9, wherein the in-vehicle entertainment system is a headrest entertainment system.

11. The remote control device of claim 9, wherein the in-vehicle entertainment system is an overhead entertainment system.

12. The remote control device of claim 9, wherein the in-vehicle entertainment system is a console entertainment system.

13. The remote control device of claim 9, wherein the user-operable switches on the first side further control compact disc (CD), Moving Pictures Expert Group-1, Audio Layer 3 (MP3), Windows Media Audio (WMA), Universal Serial Bus (USB), or surround sound of the in-vehicle entertainment system.

14. The remote control device of claim 9, the housing further comprising:
    a switch for changing an operating mode of the remote control device.

15. The remote control device of claim 14, the housing further comprising:
    the first mode transmitter configured for transmitting signals input via the user-operable switches on the first side to the in-vehicle entertainment system when the remote control device is in a first operating mode.

16. The remote control device of claim 15, the housing further comprising:
    the second mode transmitter configured for transmitting signals input via the user-operable switches on the second side to the in-vehicle entertainment system when the remote control device is in a second operating mode.

17. The remote control device of claim 16, wherein the housing is flipped from the first side to the second side when the operating mode is changed from the first to the second.

18. The remote control device of claim 16, wherein the housing is flipped from the second side to the first side when the operating mode is changed from the second to the first.

* * * * *